Aug. 17, 1926.
C. W. HODGES
1,596,735
NONSKID CHAIN
Filed Oct. 13, 1922
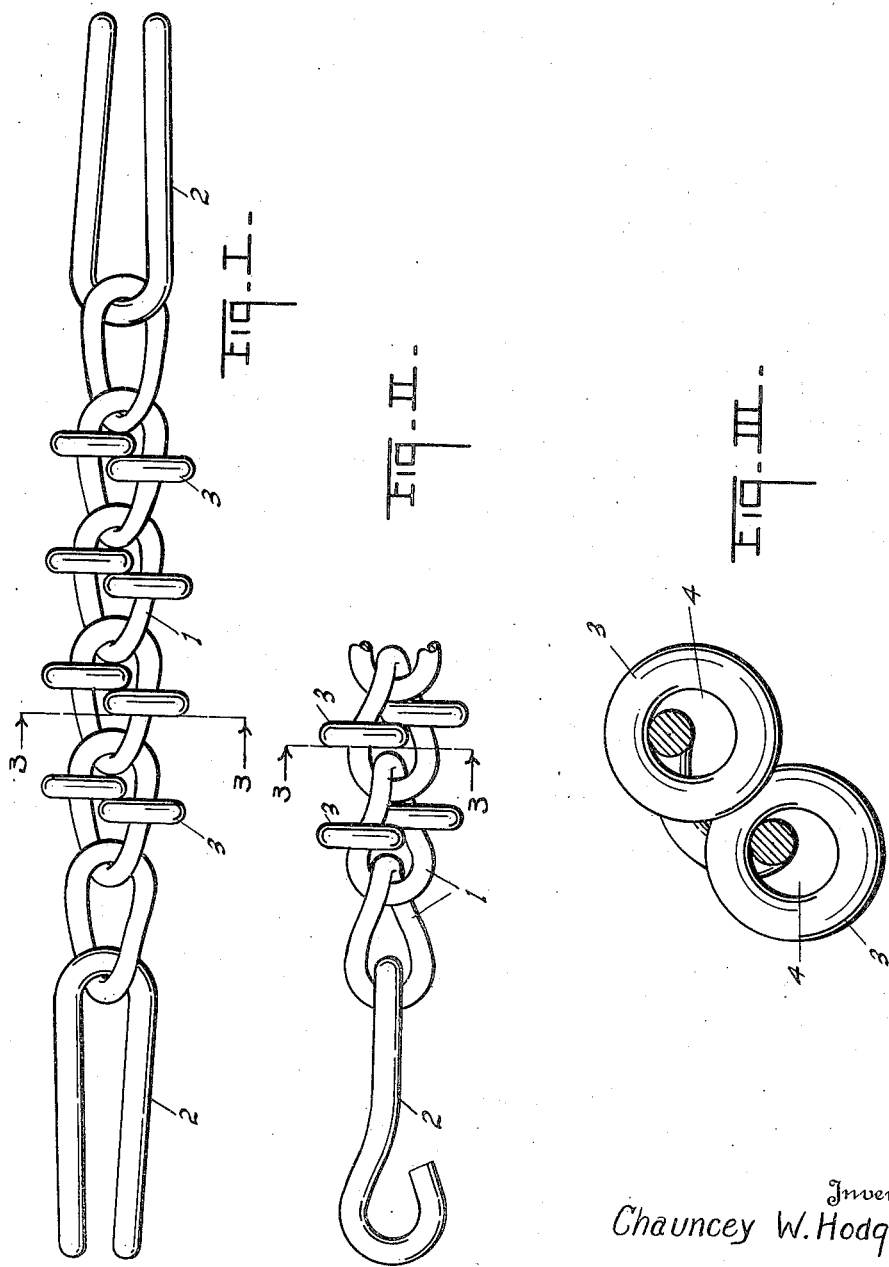
Inventor
Chauncey W. Hodges
By Chappell & Earl
Attorneys Patented Aug. 17, 1926.

1,596,735

UNITED STATES PATENT OFFICE.

CHAUNCEY W. HODGES, OF GALESBURG, MICHIGAN.

NONSKID CHAIN.

Application filed October 13, 1922. Serial No. 594,315.

This invention relates to improvements in non-skid chains.

The main object of the invention is to provide an improved cross chain or cross member for non-skid chains for vehicle wheels which is highly efficient and also very durable.

Further objects, and objects relating to structural details, will definitely appear from the detailed description to follow.

I accomplish the objects of the invention by the devices and means described in the following specification. The invention is clearly defined and pointed out in the claims.

A structure which is a preferred embodiment of my invention is clearly illustrated in the accompanying drawing, forming a part of this application, in which:

Fig. I is a plan view of a tread or cross chain embodying the features of my invention.

Fig. II is a fragmentary side elevation.

Fig. III is an enlarged section on a line corresponding to line 3—3 of Figs. I and II.

In the drawing similar reference characters refer to similar parts throughout the several views.

Referring to the drawing, my improved cross or tread chain in the embodiment illustrated comprises a plurality of links 1 of the twisted type and end hooks 2 adapted to be engaged with the side chains. A plurality of links 1 are provided with annular tread members or rings 3, the diameter of the rings being such that they project well beyond the links, their openings 4 being of such diameter that they move freely on the links, being free to rotate or slide longitudinally thereof or tilted thereon, each tread member being independent of any other tread member.

I preferably provide each link of a plurality of coengaging links with a pair of the tread members, there being a tread member on each side of the link, as illustrated.

With this arrangement of parts, I provide anti or non-skid chains which are very efficient and at the same time very durable and are not likely to cut the tires of the wheels on which the chains are used. It is found in practice that the tread members wear uniformly and that the wear on the links is uniformly distributed, the links, however, being effectively protected from road wear such as they are ordinarily subjected to when not provided with wear or tread members.

Having thus described my invention, what I claim as new and desire to secure by Letters Patent, is:

1. A non-skid chain for vehicle wheels comprising links having annular tread members loosely mounted thereon, said tread members being of such diameter that they project substantially beyond the links, their openings being of such diameter that they move freely on the links and are free to assume various positions relative to each other and to the links, each link of a plurality of coengaging links having a tread member on each side portion thereof.

2. A non-skid chain for vehicle wheels comprising links having annular tread members loosely mounted thereon, said tread members being of such diameter that they project substantially beyond the links, their openings being of such diameter that they move freely on the links and are free to assume various positions relative to each other and to the links.

3. A non-skid chain for vehicle wheels comprising links having tread rings loosely mounted thereon for free and independent rotative tilting and sliding movement, each link of a plurality of coengaging links having a tread member on each side portion thereof.

4. A non-skid chain for vehicle wheels comprising links having tread rings loosely mounted thereon for free and independent rotative tilting and sliding movement.

5. A non-skid chain for vehicle wheels comprising twisted links having annular tread members loosely mounted thereon for free rotative and lateral movement.

6. In a reinforced cross chain, the combination of a plurality of connected links with a plurality of reinforcing wear-sharing links each loosely encircling one of the connected links.

In witness whereof, I have hereunto set my hand.

CHAUNCEY W. HODGES.